(12) United States Patent
Smith

(10) Patent No.: US 9,556,927 B2
(45) Date of Patent: Jan. 31, 2017

(54) MAGNETIC VIBRATION ISOLATION MOUNT AND METHOD

(71) Applicant: Kyle Smith, Leesburg, GA (US)

(72) Inventor: Kyle Smith, Leesburg, GA (US)

(*) Notice: Subject to any disclaimer, the term of this patent is extended or adjusted under 35 U.S.C. 154(b) by 13 days.

(21) Appl. No.: 14/217,344

(22) Filed: Mar. 17, 2014

(65) Prior Publication Data

US 2015/0260252 A1   Sep. 17, 2015

(51) Int. Cl.
*F16F 15/03*   (2006.01)
*F16F 6/00*    (2006.01)

(52) U.S. Cl.
CPC *F16F 15/03* (2013.01); *F16F 6/00* (2013.01)

(58) Field of Classification Search
CPC ............... F16F 6/00; F16F 6/005; F16F 15/03
See application file for complete search history.

(56) References Cited

U.S. PATENT DOCUMENTS

| 4,314,623 | A  | * | 2/1982 | Kurokawa | 188/267 |
| 4,432,441 | A  | * | 2/1984 | Kurokawa | 188/267 |
| 6,129,185 | A  | * | 10/2000 | Osterberg et al. | 188/267.2 |
| 2004/0012168 | A1 | * | 1/2004 | Jaekel | 280/124.1 |
| 2009/0236192 | A1 | * | 9/2009 | Takeuchi | 188/267 |
| 2012/0061893 | A1 | * | 3/2012 | Hochberg et al. | 267/195 |

* cited by examiner

*Primary Examiner* — Bradley King
(74) *Attorney, Agent, or Firm* — Withers & Keys, LLC

(57) ABSTRACT

The current invention is an improved magnetic vibration isolation mount and method that can provide a passive and active reduction in the actual and felt vibration transfer from one object to another. The vibration isolation mount is comprised of a mounting means for a first member, a mounting means for a second member, and a rod and magnetic field apparatus between the two mounts and members. The invention can also be seen as a method for the control of vibration transmission from a first member to a second member via either passive or active means.

20 Claims, 6 Drawing Sheets

MAGNETIC VIBRATION ISOLATION MOUNT AND METHOD

CROSS-REFERENCE TO RELATED APPLICATIONS

Provisional Application No. 61/792,763 with Confirmation #9762

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention is in the technical field of vibration dampening. More particularly, the present invention is in the technical field of magnetic fields that act to isolate vibration between two units. This invention relates to the improvement of a magnetic vibration isolating device and method.

There is often a need to reduce the transmission of vibrational forces between two members of a structure or device while still maintaining sufficient mechanical support with the primary goal of reducing both vibration and noise felt by equipment and persons.

There are many areas that have a need for the reduction in the transfer of vibrational forces from one member to another member. One such situation involves the need to reduce noise and vibration transfer between the many connection points found in an automobile such as those between outside structural panels and interior trim, and between seats and their mounts, and between the various engine and mechanical parts and the members to which they are mounted. Another situation involves the reduction of cabin vibration and noise found in conventional aircraft whereas one of the major avenues for the transfer of vibrational forces occurs at the mounts between the main air frame and interior trim. Another situation involves the transfer of vibrational energy between different pieces of industrial and/or manufacturing equipment or tools and what they are mounted or connected to, and also to what they come into contact with, including persons.

A majority of the conventional vibration dampening devices often utilize springs and/or liquid or gas pressure to create a reduction in shock and vibration. These devices all have different applications and all serve for the isolation of vibration between two surfaces. Typically the devices are used when it is desirable to reduce the transfer of energy in the form of vibration between two surfaces that need to be attached in a secure form while at the same time not carry over any of the energy of the vibration. Vibration dampening needs change according to the intensity of the frequency and amplitude of the vibrations, therefore a device is often needed that can adjust or vary the amount of dampening.

Elastomeric, spring, air, liquid vibration isolating devices are commonly used today as a mounting means for motors, engines and other miscellaneous equipment. These vibration dampening devices range from simple spring based systems to complex elastomeric devices, however they all have different issues and weaknesses. It is therefore an objective of the present invention to provide an improved mount and method for vibration reduction.

SUMMARY OF THE INVENTION

The present invention is an apparatus and method for magnetic vibration isolation.

The invention may be conceptualized as a mount that will provide a dampening effect between two objects or members that are joined together. The general idea is that this mounting device will give a simple, sturdy and effective means of joining two surfaces or objects with the transfer of vibration minimized from the first member to the second member. The magnetic vibration isolation mount comprises a first and second mounting means for mounting the first and second member respectively. Magnets are arranged between the first and second mounting means and are coupled to each member, wherein the magnets are arranged in a way that provides an opposing magnetic force between the two members.

The invention may also be conceptualized as a method as a vibration dampening or isolation method. The method controls the amount of vibration that is transmitted from the first member to the second member when both members have the opposing magnets between the two members. The magnet arrangement between the two members provides a delay and reduction in the transmission of vibration energy between the two members. The method comprises the steps of (1) sensing the vibration energy and force in one member; (2) applying a force on the second member in response to the sensed vibrational energy in the first member in order to reduce vibrations; (3) allowing for the storage of energy during normal vibrations of the first member in order to have the power storage necessary to efficiently counteract force with the second member from an unusually violent sensed vibration episode of the first member.

In one embodiment, the mount could just simply be used to control the transfer of vibration energy across one plane or axis. In another embodiment the mount could be utilized to limit the transfer of vibration across multiple axes and directions. In another embodiment the mount could not only be used to control vibration but it could utilize the vibration energy altering the magnetic field it is in to create electricity and could provide a means for both the storage and release of this electrical energy. In yet another embodiment involving the storage of electrical energy the energy could be released in a particular violent episode of vibration energy in an attempt to increase the available vibration dampening capacity for that particular episode.

DETAILED DESCRIPTION OF THE INVENTION

In the following detailed description of the preferred embodiments, reference is made to the accompanying drawings which form a part hereof, and within which are shown by way of illustration specific embodiments by which the invention may be practiced. It is understood that other embodiments may be utilized and structural changes may be made without departing from the scope of the invention.

Turning now to the drawings wherein like numbers refer to like features throughout the drawings, the present invention comprises a magnetic vibration isolation mount.

Figure 1:
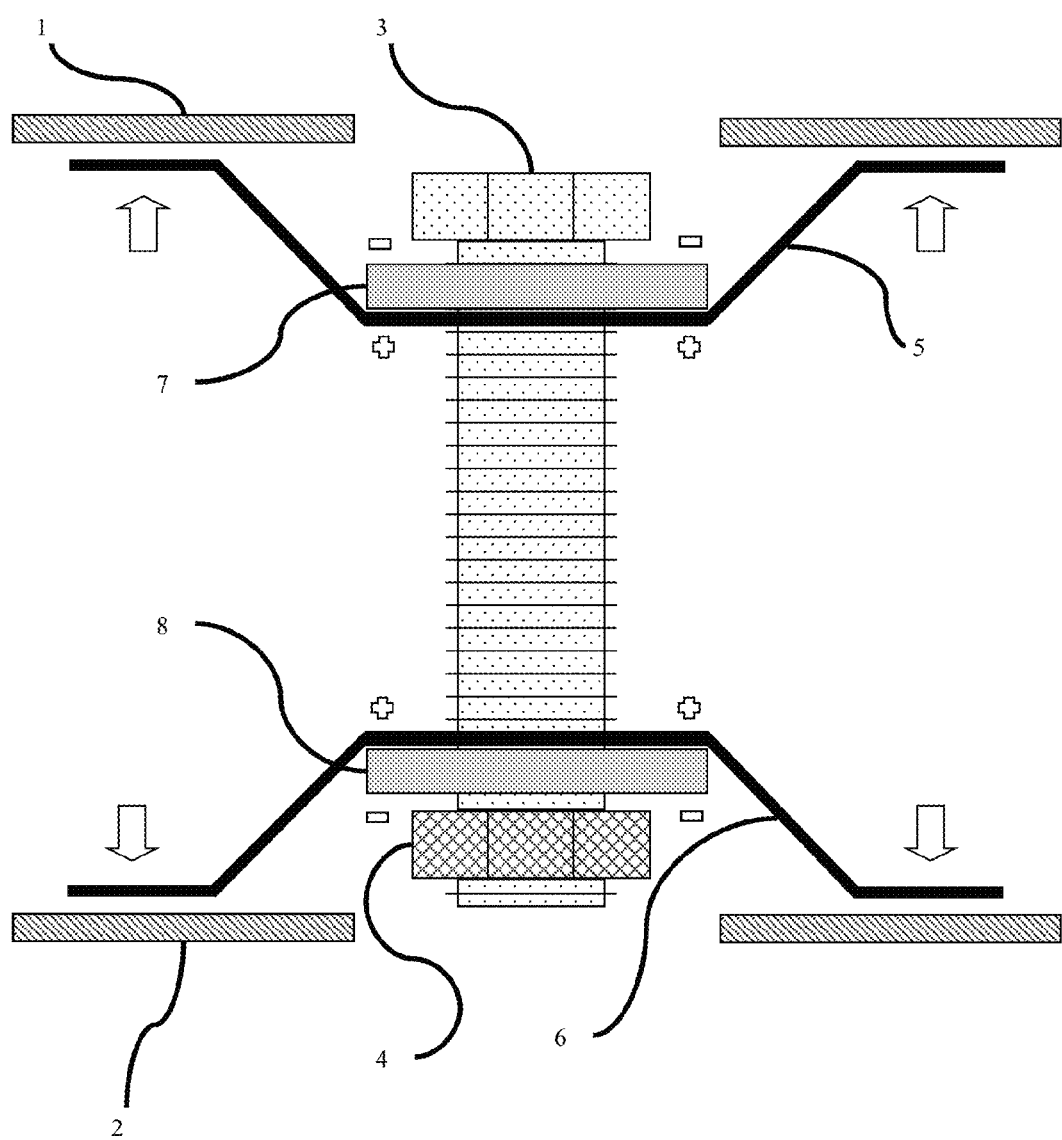
FIG. 1 is a front view of one embodiment of a magnetic vibration isolation mount of the present invention.

Referring now to the invention in more detail, in FIG. 1 there is shown an front view of a magnetic isolation mount composed of a mounting bracket 5 intended to secure one side of the mount assembly to a first member 1 and another mounting bracket 6 intended to secure another side of the mount assembly to the second member 2. The two mounting brackets 5,6 have magnets 7, 8 mounted through a connecting rod or bolt 3 with the magnetic poles facing each other in order to apply a repealing force between the two magnets 7,8 and therefore the repealing force will carry over to the two mounting brackets 5,6 and the corresponding members 1,2. The two mounting brackets 1,2 are held together structurally with a through rod/bolt 3 and a nut or tightening device 4. This nut 4 may be tightened in order to bring the two magnets 7,8 together and get a higher level of repulsion or may be inversely loosened in order to lower the level of repulsion. The mounting brackets 5,6 can be secured to the members 1,2 through various different means including bolts, screws, welds, glues, etc. Although in this preferred embodiment of the current invention the repulsion is shown to occur between two permanent magnets 7,8, in another embodiment the magnets 7,8 may be electromagnets controlled by a circuit in order to increase or decrease the level of repulsion and therefore the transfer of vibrational forces between the two members 1,2. In another embodiment the strength and size of the magnets can be readily swapped for differing applications or loads and the adjustment of the nut or tightening device 4 would result in differing repulsion strengths. Although in this preferred embodiment of the current invention the mount is shown to connect two members 1,2 across one axis, in another embodiment the current invention can be utilized to connect members across multiple axes. In another embodiment of the current invention a shielding may be in place to prevent magnetic field interference with surrounding materials.

Figure 2:
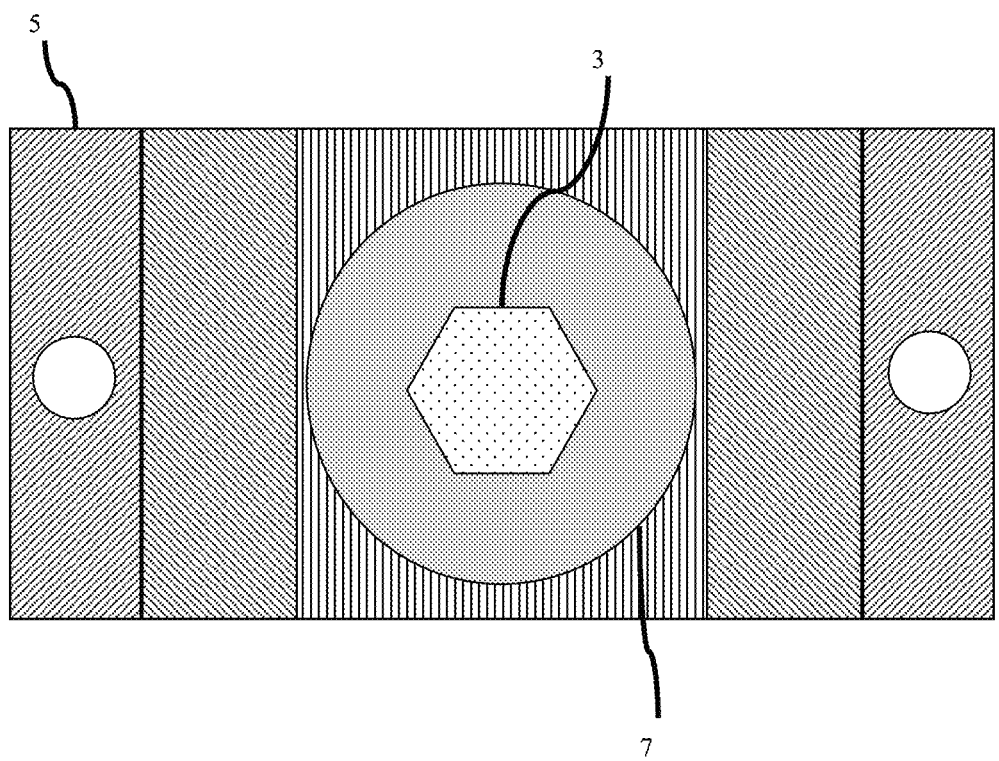
FIG. 2 is a top view of one embodiment of a magnetic vibration isolation mount of the present invention.

Referring now to the invention shown in FIG. 2 there is shown a top view of the current invention. In this top view embodiment of a portion of the current invention the mounting bracket 5 is shown to have mounting holes in order to secure the bracket to a member. The rod or bolt 3 is shown to exist in order to hold the two brackets and magnet assemblies together structurally, this rod or bolt 3 is also shown holding the magnet 7 to the mounting bracket 5.

Figure 3:
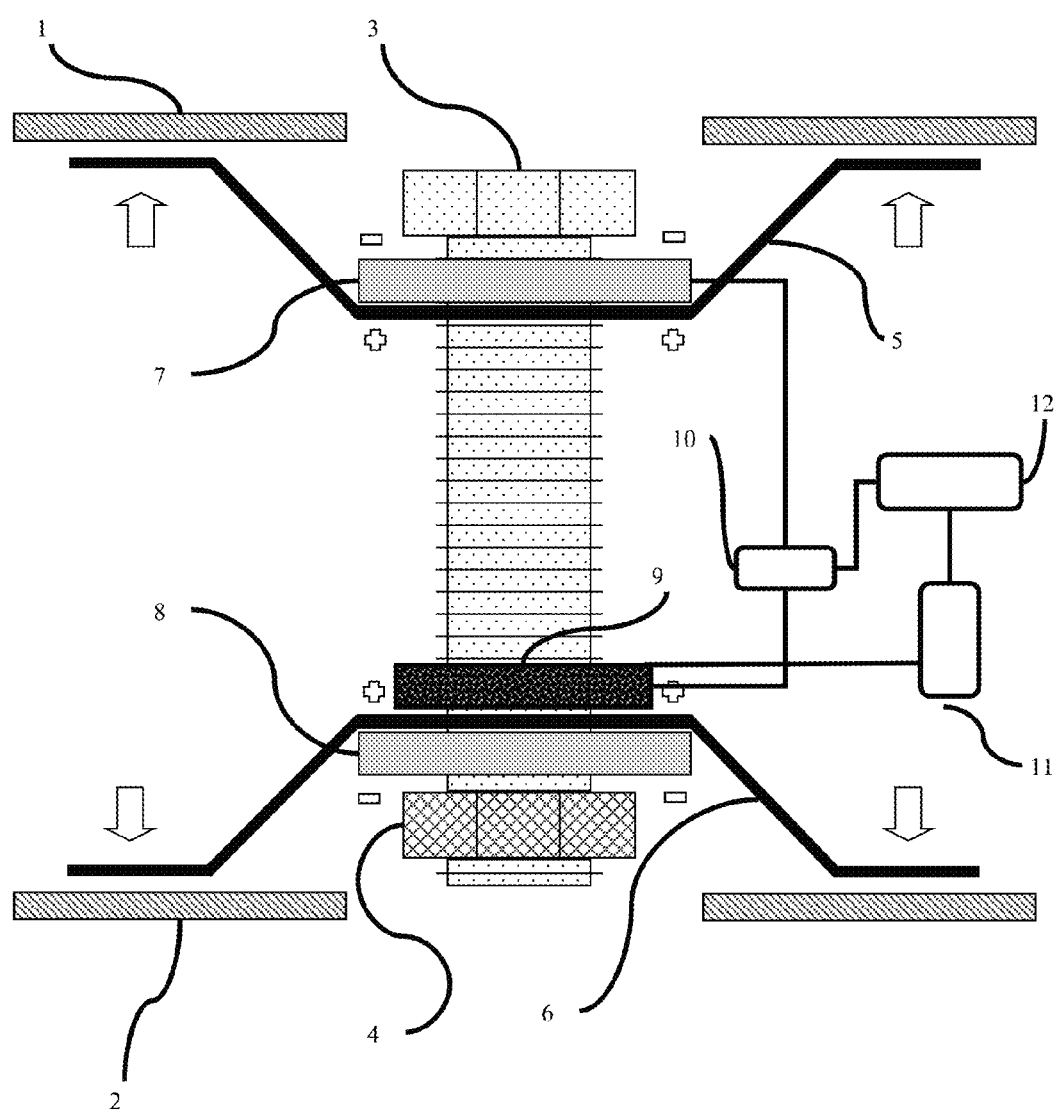
FIG. 3 is a front view of another embodiment of a magnetic vibration isolation mount of the present invention.

In another embodiment, and as depicted in FIG. 3, a wire coil 9 is shown to exist wrapped around the rod or bolt 3 section of the mount. This wire coil 9 may act as a means to harness the electrical energy generated by the changing magnetic field caused by the continuing change in distance between the two magnets 7, 8 and with the storage of the energy occurring in a capacitor device 11. This means of harnessing electrical energy with a changing magnetic field is well documented in prior art. In another embodiment utilizing electromagnets in the place of magnets 7, 8 a sensor arrangement 10 is shown that would sense vibrations in the first member and the subsequent transfer of force into the second member, a controller actuator arrangement 12 to handle and produce the proper control of the force to the second member and for the setting of parameters necessary for a proper response to a vibrational force detected by the sensor arrangement 10. In this embodiment, the necessary amount of stored electrical energy could be released in a particular violent episode of vibration energy sensed from the first member in an attempt to increase the available vibration dampening capacity for that particular episode. The magnet arrangement may be adapted to provide a delay equal to that delay in the application of the controlling force in response to the sensed vibrations in the first member. This entire invention in any of the embodiments presented may be made of virtually any material (fiberglass, metal, plastic, foam, glass or wood) and be of the dimensions sufficient to efficiently contain all the components of the present invention without limitation.

Figure 4:
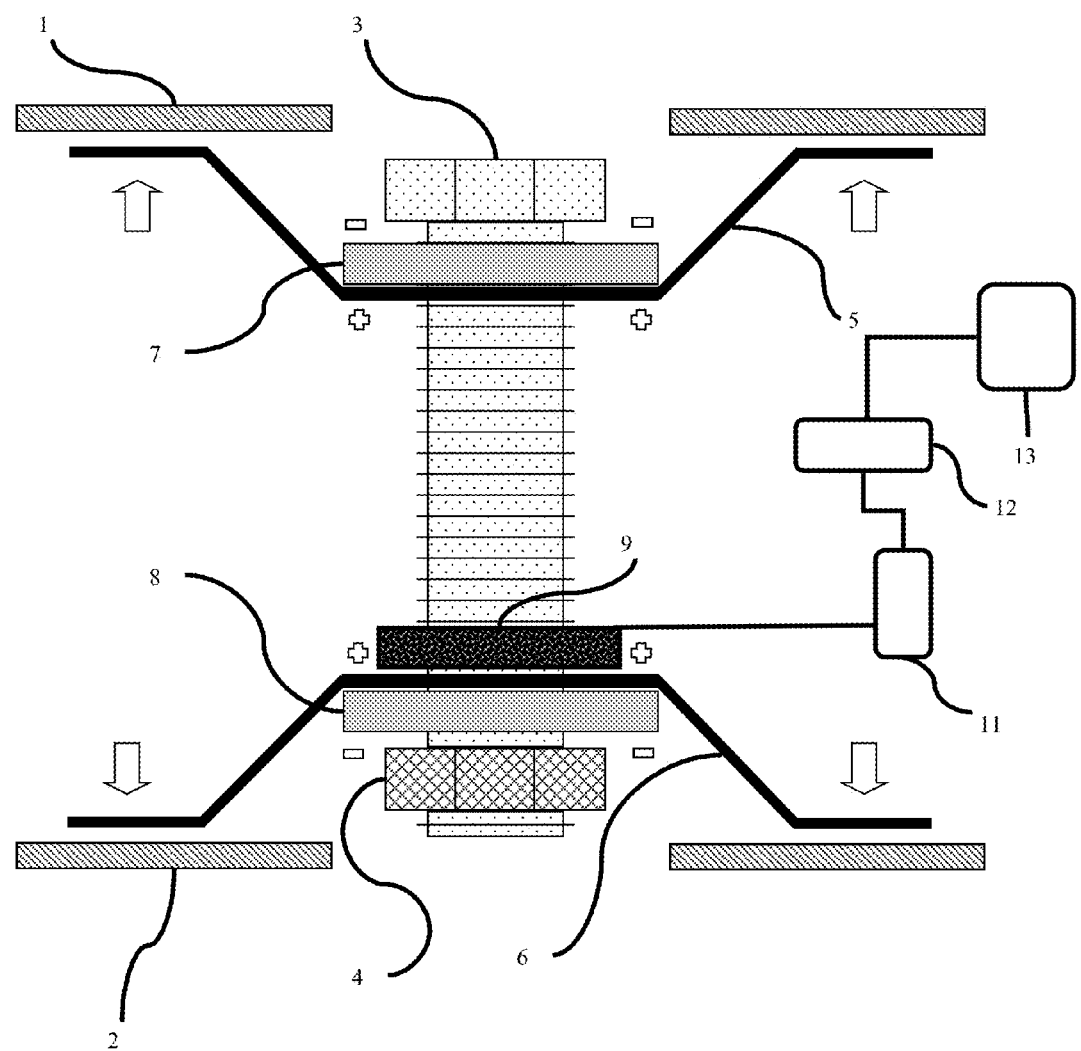
FIG. 4 is a front view of another embodiment of a magnetic vibration isolation mount of the present invention.

Referring now to the invention shown in FIG. 4 there is shown yet another side view of another embodiment of the present invention. In this embodiment, a long term electrical energy storage device or battery 13 is shown in conjunction with the short term capture device or capacitor device 11 and the controller actuator arrangement 12. This embodiment would allow for the long term storage of the difference in electrical energy generated and that energy needed to counter the vibrational forces from the first member.

Figure 5:
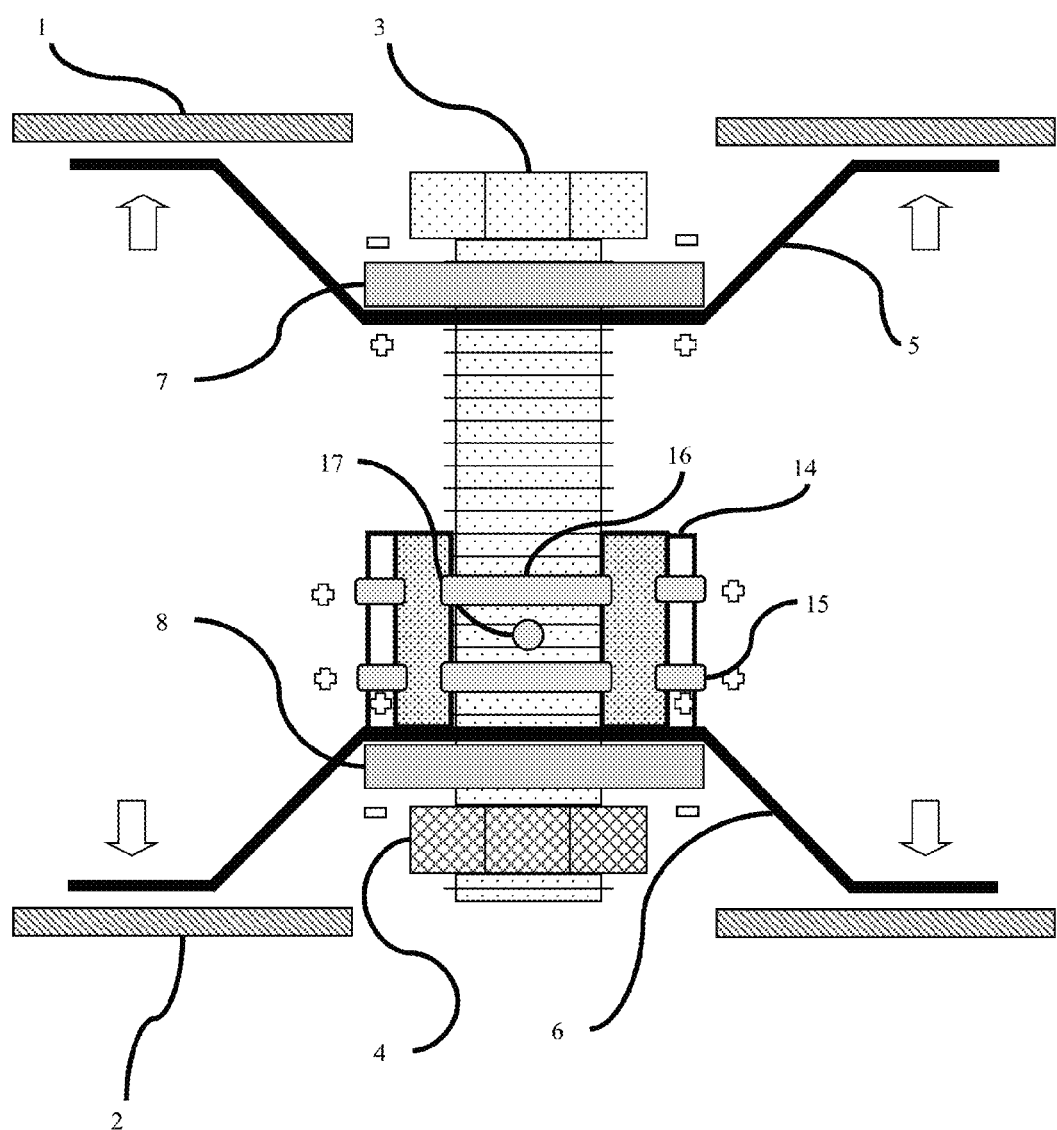
FIG. 5 is a front view of another embodiment of a magnetic vibration isolation mount of the present invention.

In FIG. 5 the current invention is shown in another embodiment that it may be further equipped with another bracket 14 that contains additional magnets 15 arranged in such a way that the poles opposed the poles of the other additional magnets 16, 17 placed on the bolt/rod 3 of the mount. The intention of these additional magnet arrangements is for the stability and vibration dampening capacities of the mount in a different plane from the plane of mounting plates 5,6. Basically, these new magnet arrangements and their magnetic fields should act to further stabilize the mount in other directions or along other axes than the primary direction or axis demonstrated by the arrows on the illustration.

Figure 6:
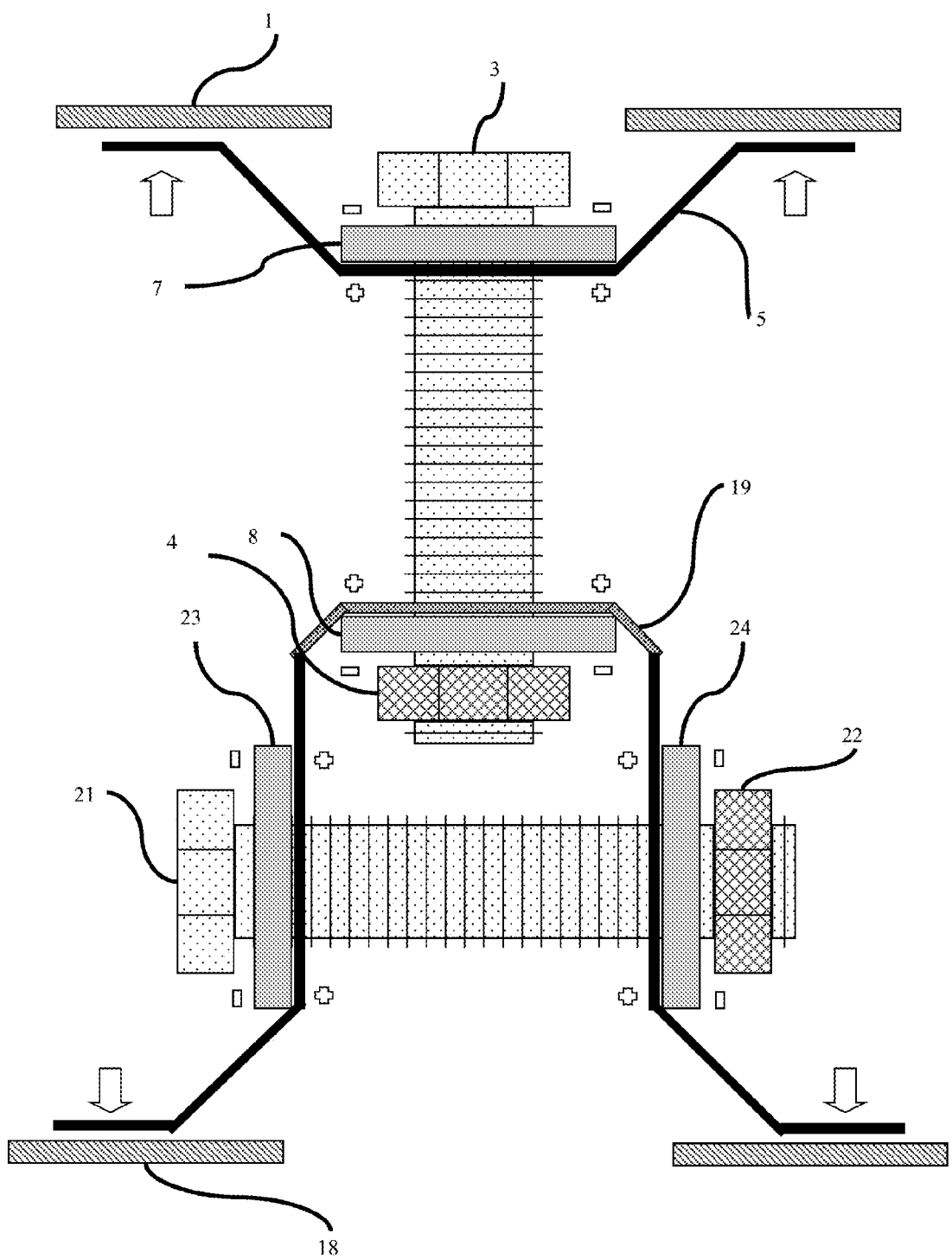
FIG. 6 is a front view of another embodiment of a magnetic vibration isolation mount of the present invention.

In FIG. 6 the current invention is shown in another embodiment that it may be further equipped with yet another mounting bracket 19 intended to secure one side of the mount assembly to the second member 18 and as a support for another assembly of rods/bolts 21 nuts 22 and magnets 23, 24 as described in FIG. 1, but arranged in another plane or axis as the other rod 3, nut 4 and magnets 7, 8. In this embodiment, the two directional mount would act to more effectively handle vibration dampening from multiple directions. Although in this embodiment the unit is shown to contain just two bolts, nuts and magnet assemblies, one familiar in the art will understand that these magnet vibration reductions assemblies can be arranged in a plurality of configurations along different axes.

The advantages of the present invention include, without limitation, is that it provides for a simple yet effective means of vibration dampening between multiple members. The mount will help to eliminate the transfer of vibrational forces from one object to another or a plurality of other objects through the connecting mount. The mount may also be used to harness electrical energy and to counteract extraordinary shocks from one member to another by applying additional forces when needed.

In broad embodiment, the present invention is a magnetic vibration isolation mount and method. This mount and method will allow the reduction in actual and felt vibration transfer from one object to another and may act to significantly reduce wear and tear on other objects, surfaces or persons due to the this reduction in vibration energy.

While the foregoing written description of the invention enables one of ordinary skill to make and use what is considered presently to be the best mode thereof, those of The following is claimed:

1. A vibration isolation mount for attaching a first object to a second object and for reducing the transmission of vibrations between the first object and the second object, the vibration isolation mount comprising:
   a first mounting bracket that is attachable to the first object;
   a second mounting bracket that is attachable to the second object;
   a rod or bolt extending through each of said first mounting bracket and said second mounting bracket and connecting said first mounting bracket to said second mounting bracket, said rod or bolt having a rod or bolt first end and a rod or bolt second end opposite said rod or bolt first end;
   a magnetic or electromagnetic assembly comprising first and second magnets positioned along said rod or bolt with said first magnet being positioned adjacent said first mounting bracket and said second magnet being positioned adjacent said second mounting bracket, said first and second magnets being arranged so that like polarity magnetic poles of said first and second magnets are facing each other; and
   a tightening member positioned along said rod or bolt, said tightening member being movable along said rod or bolt so as to increase or decrease a distance between said first and second magnets.

2. A vibration isolation mount according to claim 1, wherein said first magnet is positioned between said first mounting bracket and said rod or bolt first end, and said second magnet is positioned between said second mounting bracket and said rod or bolt second end.

3. A vibration isolation mount according to claim 1, wherein said first mounting bracket comprises a first mounting bracket first connecting portion for connecting to the first object, a first mounting bracket second connecting portion for connecting to the first object, and a first mounting bracket intermediate portion for connecting with said rod or bolt; and said second mounting bracket comprises a second mounting bracket first connecting portion for connecting to the second object, a second mounting bracket second connecting portion for connecting to the second object, and a second mounting bracket intermediate portion for connecting with said rod or bolt.

4. A vibration isolation mount according to claim 3, wherein said first magnet is positioned between said first mounting bracket intermediate portion of said first mounting bracket and said rod or bolt first end, and said second magnet is positioned between said second mounting bracket intermediate portion of said second mounting bracket and said rod or bolt second end.

5. A vibration isolation mount according to claim 3, further comprising:
   a third bracket extending upward from said second mounting bracket intermediate portion along positioned a separation distance from said rod or bolt;
   one or more third magnets positioned along said third bracket; and
   one or more fourth magnets positioned on said rod or bolt and within a plane containing said one or more third magnets, said one or more fourth magnets being arranged so that like polarity magnetic poles of each of said one or more fourth magnets are facing like polarity magnetic poles of each of said one or more third magnets.

6. A method of using the mount of claim 5 to control an amount of vibration transferred from a first object to a second object, said method comprising:
   attaching the first mounting bracket to the first object;
   attaching the second mounting bracket to the second object; and
   adjusting a position of the tightening member along the rod or bolt so as to increase or decrease an amount of magnetic repelling force between the first magnet and the second magnet.

7. A vibration isolation mount according to claim 3, wherein said second mounting bracket further comprising (i) a first opposing bracket wall extending between said second mounting bracket first connecting portion and said second mounting bracket intermediate portion intermediate portion; and (ii) a second opposing bracket wall extending between said second mounting bracket second connecting portion and said second mounting bracket intermediate portion intermediate portion; and said mount further comprises:
   a second rod or bolt extending through each of said first opposing bracket wall and said second opposing bracket wall and connecting said first opposing bracket wall to said second opposing bracket wall, said second rod or bolt having a second rod or bolt first end and a second rod or bolt second end opposite said second rod or bolt first end;
   a second magnetic or electromagnetic assembly comprising third and fourth magnets positioned along said second rod or bolt with said third magnet being positioned adjacent said first opposing bracket wall and said fourth magnet being positioned adjacent said second opposing bracket wall, said third and fourth magnets being arranged so that like polarity magnetic poles of said third and fourth magnets are facing each other; and
   a second tightening member positioned along said second rod or bolt, said second tightening member being movable along said second rod or bolt so as to increase or decrease a second distance between said third and fourth magnets.

8. A method of using the mount of claim 7 to control an amount of vibration transferred from a first object to a second object, said method comprising:
   attaching the first mounting bracket to the first object;
   attaching the second mounting bracket to the second object;
   adjusting a position of the tightening member along the rod or bolt so as to increase or decrease an amount of magnetic repelling force between the first magnet and the second magnet; and
   adjusting a position of the second tightening member along the second rod or bolt so as to increase or decrease an amount of magnetic repelling force between the third magnet and the fourth magnet.

9. A vibration isolation mount according to claim 1, further comprising:
   a wire coil wrapped around said rod or bolt, said wire coil being capable of harnessing electrical energy generated by a changing magnetic field caused by movement of said first and second magnets along said rod or bolt; and a capacitor capable of storing the electrical energy generated by the changing magnetic field.

10. A method of using the mount of claim 9 to control an amount of vibration transferred from a first object to a second object, said method comprising:
    attaching the first mounting bracket to the first object;
    attaching the second mounting bracket to the second object;
    adjusting a position of the tightening member along the rod or bolt so as to increase or decrease an amount of magnetic repelling force between the first magnet and the second magnet; and
    storing electrical energy generated by the changing magnetic field via the capacitor.

11. A vibration isolation mount according to claim 1, wherein each of said first and second magnets comprises an electromagnet, and said mount further comprises:
    a wire coil wrapped around said rod or bolt, said wire coil being capable of harnessing electrical energy generated by a changing magnetic field caused by movement of said first and second magnets along said rod or bolt;
    a capacitor capable of storing the electrical energy generated by the changing magnetic field;
    a sensor that senses vibration of the first object; and
    a controller actuator capable of providing a controlled amount of force onto the second object in response to the vibration of the first object sensed by said sensor.

12. A method of using the mount of claim 11 to control an amount of vibration transferred from a first object to a second object, said method comprising:
    attaching the first mounting bracket to the first object;
    attaching the second mounting bracket to the second object;
    adjusting a position of the tightening member along the rod or bolt so as to increase or decrease an amount of magnetic repelling force between the first magnet and the second magnet; and
    applying a controlled amount of force onto the second member in response to the vibration of the first member sensed by the sensor, the controlled amount of force being generated via the controller actuator.

13. A method according to claim 12, wherein the first object and the second object are each independently components of (i) an airplane, (ii) a boat, (iii) an automobile, (iv) machinery or factory equipment, or (v) farm equipment.

14. A vibration isolation mount according to claim 11, further comprising:
    a battery capable of storing electrical energy generated by the changing magnetic field caused by movement of said first and second magnets along said rod or bolt.

15. A method for vibration isolation between two surfaces using the mount of claim 11, wherein the method comprises:
    sensing vibrations in the first member; and
    in response to sensed vibrations in the first member, applying a force to the second member in order to reduce transmission of the sensed vibrations to the second member.

16. The method of claim 15, wherein a control signal is generated in response to the sensed vibration; and the force is applied via the controller actuator.

17. A vibration isolation mount according to claim 1, wherein said mount is attached to said first object and (ii) said second object.

18. A vibration isolation mount according to claim 1, wherein said first object and said second object are each independently components of (i) an airplane, (ii) a boat, (iii) an automobile, (iv) machinery or factory equipment, or (v) farm equipment.

19. A method of using the mount of claim 1 to control an amount of vibration transferred from a first object to a second object, said method comprising:
    attaching the first mounting bracket to the first object;
    attaching the second mounting bracket to the second object; and
    adjusting a position of the tightening member along the rod or bolt so as to increase or decrease an amount of magnetic repelling force between the first magnet and the second magnet.

20. A method according to claim 19, wherein the first object and the second object are each independently components of (i) an airplane, (ii) a boat, (iii) an automobile, (iv) machinery or factory equipment, or (v) farm equipment.

* * * * *